US007924709B2

(12) United States Patent  
Lynn (10) Patent No.: US 7,924,709 B2  
(45) Date of Patent: Apr. 12, 2011

(54) ACCESS CONTROL OF RESOURCES USING TOKENS

(75) Inventor: James Lynn, New Tripoll, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1917 days.

(21) Appl. No.: 10/843,593

(22) Filed: May 12, 2004

(65) Prior Publication Data

US 2005/0254514 A1    Nov. 17, 2005

(51) Int. Cl.
  *H04J 1/16* (2006.01)
(52) U.S. Cl. .............................. 370/230; 726/9
(58) Field of Classification Search .............. 370/229, 370/230, 235, 389, 392, 393, 431, 438, 449, 370/450–452, 461; 726/4, 5, 9, 11, 13, 16–21, 726/26–29
  See application file for complete search history.

(56) References Cited

U.S. PATENT DOCUMENTS

| | | | |
|---|---|---|---|
| 5,596,576 A * | 1/1997 | Milito ........................... | 370/450 |
| 6,714,541 B1 * | 3/2004 | Iyer et al. ...................... | 370/392 |
| 6,718,328 B1 * | 4/2004 | Norris ................................. | 707/9 |
| 6,996,647 B2 * | 2/2006 | Raghavan et al. ............ | 710/240 |
| 7,072,354 B1 * | 7/2006 | Beathard ....................... | 370/447 |
| 7,180,899 B2 * | 2/2007 | De Silva et al. ......... | 370/395.31 |
| 7,610,617 B2 * | 10/2009 | Kelly et al. ........................ | 726/5 |
| 2002/0099663 A1 | 7/2002 | Yoshino | |
| 2003/0219028 A1 * | 11/2003 | Peyravian et al. ............. | 370/439 |
| 2004/0006693 A1 * | 1/2004 | Vasnani et al. ................ | 713/168 |
| 2004/0104097 A1 * | 6/2004 | Ngee .............................. | 194/210 |
| 2004/0218588 A1 * | 11/2004 | Karamchedu et al. ........ | 370/352 |
| 2005/0128951 A1 * | 6/2005 | Chawla et al. ................ | 370/235 |
| 2005/0216422 A1 * | 9/2005 | Lotspiech et al. .............. | 705/66 |
| 2006/0005028 A1 * | 1/2006 | Labaton ......................... | 713/176 |
| 2007/0202955 A1 * | 8/2007 | Frerking et al. ................. | 463/42 |

OTHER PUBLICATIONS

Microsoft Corporation, Windows 2000 Kerbero Authentication White Paper, "Windows 2000 Kerberos Authentication," Jul. 1999, pp. 1-46, Microsoft Corporation, One Microsoft Way, Redmond, WA 98052-6389.

Fujimura, Ko, et al., "XML Ticket: Generalized Digital Ticket Definition Language," Sep. 3, 1998, available at http://www.w3.org/DSig/signed-XML99/pp/NTT_xml_ticket.html, (retrieved Mar. 22, 2005).

European Patent Office, "Communication Pursuant to Article 94(3) EPC," Office Action Dated May 15, 2009, for Application No. 05 252 846.0-2413.

* cited by examiner

*Primary Examiner* — Ricky Ngo
*Assistant Examiner* — Kan Yuen (57) ABSTRACT

An electronic token useable for controlling access to a resource is described. The token includes a token grantor identifier indicating a token grantor, a token grantee identifier indicating a token grantee, and a resource access control field. The resource access control field indicates control of additional limitations of token grantee access to a resource as specified by the token grantor. A method for generating and using the electronic token includes generating an electronic token based on a token grantee identifier, a token grantor identifier, and a resource access control field, wherein the resource access control field indicates control of additional limitations of token grantee access to a resource as specified by the token grantor. The electronic token is transmitted to a token grantee computer system. The token grantee computer system transmits the electronic token to a computer system controlling access to a resource requested by the token grantee computer system.

24 Claims, 3 Drawing Sheets

ACCESS CONTROL OF RESOURCES USING TOKENS

FIELD OF THE INVENTION

The present invention relates to controlling unauthorized access to network resources.

BACKGROUND

Currently, many Internet protocols do not require any form of authentication for access. The most widely publicized abused protocols is email, i.e., the simple mail transfer protocol (SMTP), in the form of SPAM. The same abuses occur with web servers where access is either granted to anyone or requires a login procedure or certificate (X.500). What is absent is a simple method for a person using a program to grant permission for a specific entity to access the resources, i.e., Internet protocol-based services. The email example is perhaps the best because it demonstrates the notion of what might be thought of as a virtual resource. Consider an individual user having an email address of <<john.doe@isp.net>>. The user may not actually control the email server and does not control the resource in the conventional sense; however, when the user receives unwanted email, there exists an undesirable and negative impact on resources, i.e., the user's time (and unwanted frustrations associated with the unwanted email), bandwidth between the client machine and the ISP/mail server, the mail server processor and memory usage, and bandwidth usage on various parts of the Internet.

The user would like to never again receive any unwanted email. Existing software filters allow a client to accept only emails from specified email addresses or domains. This solution is not easily manageable, since it requires manually adding email addresses or domains to a list, sometimes known as a "white list". If the user visits a web site and wishes to receive offers from this company via email, he must manually add this name to his white list either at the client or at his mail server.

SUMMARY

One embodiment according to the present invention provides an electronic token useable for controlling access to a resource. The token includes a token grantor identifier indicating a token grantor, a token grantee identifier indicating a token grantee, and a resource access control field. The resource access control field indicates control of additional limitations of token grantee access to a resource as specified by the token grantor.

A method aspect includes generating and using an electronic token having a token grantee identifier, a token grantor identifier, and a resource access control field. The electronic token is generated based on a token grantee identifier, a token grantor identifier, and a resource access control field. The resource access control field indicates control of additional limitations of token grantee access to a resource as specified by the token grantor. The electronic token is transmitted to a token grantee computer system. The token grantee computer system transmits the electronic token to a computer system controlling access to a resource requested by the token grantee computer system.

Still other advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, the mechanism of the present invention provides improved control of access to network resources.

Figure 1:
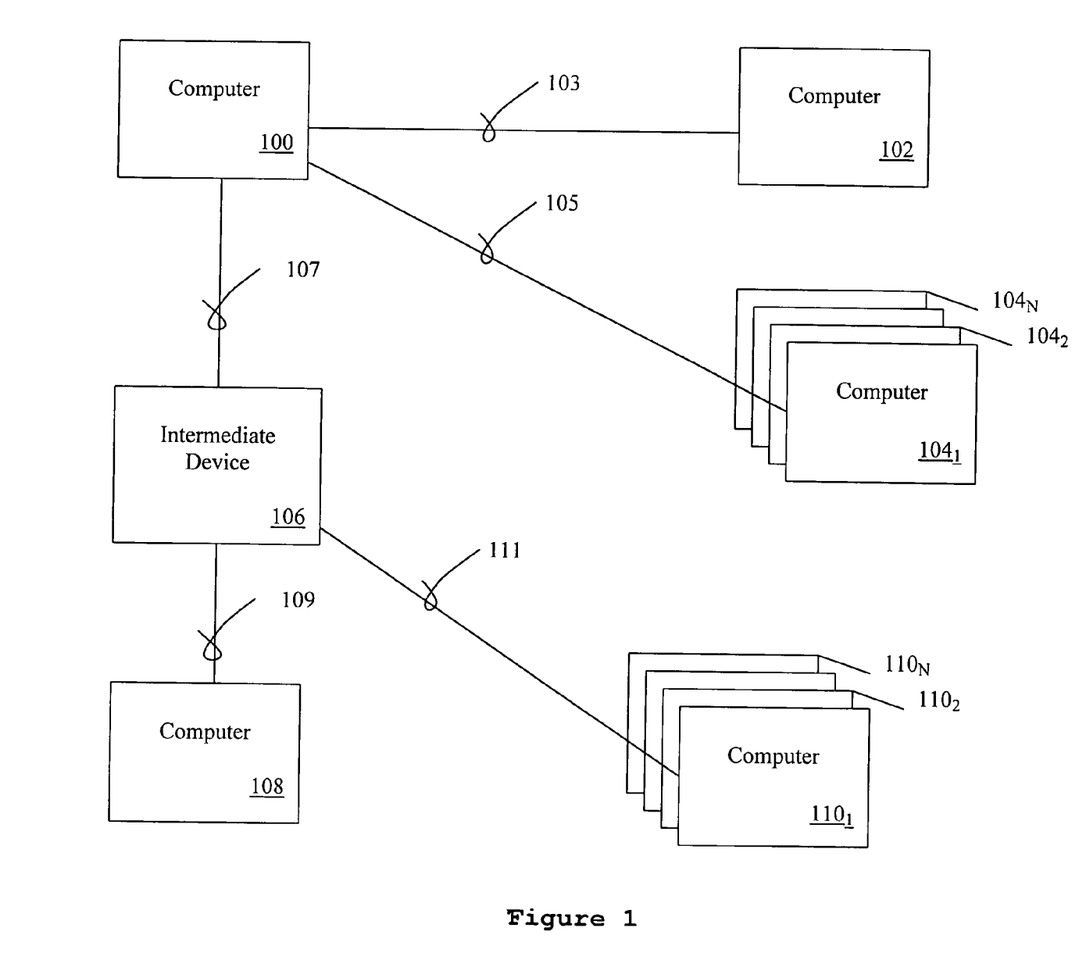
FIG. 1 is a high-level block diagram of a computer network usable in conjunction with an embodiment of the present invention.

In one embodiment, a user at a client computer 100 (described in detail below) manipulates the computer to access a resource, e.g., a web site, web services server, or email server, provided by another computer 102 connected to the client computer via a communication path 103. Client computer 100 accesses the resource by transmission of a message to computer 102 requesting access to a particular network address, e.g., a uniform resource location (URL), at computer 102, e.g., the client computer accesses a network address. Responsive to receipt of the message transmitted by client computer 100, computer 102 transmits the requested information to the client computer via communication path 103. In this manner, a user at client computer 100 accesses network resources, e.g., browse the Internet, send and/or receive electronic mail (E-mail), etc.

As depicted in FIG. 1, additional embodiments include the addition of multiple computers $104_{1-N}$ connected to computer 100 via a communication path 105, e.g., a network, and the addition of an intermediate device 106, e.g., a router and/or a firewall, connected to computer 100 via a communication path 107 and providing additional communication connectivity to another computer 108, and/or other computers $110_{1-N}$ via communication paths 109 and 111, respectively.

In one embodiment according to the present invention, a user at client computer 100 causes the computer to transmit an electronic token (described in detail below) to computer 102 via communication path 103 thereby enabling access to resources at the client computer. After receipt of the electronic token, computer 102 accesses resources at client computer 100 by transmitting in message including the electronic token in conjunction with a resource request to client computer 100. After receipt of the message from computer 102, client computer 100 evaluates the electronic token to determine whether to allow computer 102 to access the resource requested.

In one embodiment, the electronic token includes an identifier of the token generator, e.g., client computer 100, the user, etc., and an identifier of the token recipient, e.g. computer 102. Generation of the electronic token includes concatenating the generator identifier with the recipient identifier, e.g., concatenation of a network address of client computer 100 and computer 102. For example, an electronic token such as <<computer.domain.com~computer.resource.com>> enables access by a computer having an address of <<computer.domain.com>> to a network resource located at a computer having an address of <<computer.resource.com>>. Alternatively, multiple computers at a given domain may be allowed access to client computer 100 by specifying a portion of the network address, e.g., <<domain.com>>, thereby allowing access to all computers within the given domain. In the same manner, access to resources at multiple computers at a given domain may be allowed by specifying a portion of the network address of the resource providing computers, e.g., <<resource.com>>.

It will be understood by persons of skill in the art the modification to the format and structure of the electronic token is possible without departing from the spirit and scope of the embodiments according to the present invention.

In one embodiment according to the present invention, the electronic token is presented as part of the body of the message transmitted from computer 102 to client computer 100. In another embodiment, the electronic token is transmitted as part of the envelope information of the message transmitted from computer 102 to client computer 100, e.g., the electronic token is embedded in the message header information.

Similar to the above described interaction between computer 102 and client computer 100, in another embodiment, computer 108 transmits a message including an electronic token previously received from computer 100 to intermediate device 106 via communication path 109 en route to accessing a resource from computer 100. The intermediate device 106 evaluates the received electronic token to determine whether to allow computer 108 to computer 100. If intermediate device 106 determines that the electronic token fails to enable access by computer 108 to computer 100, intermediate device does not provide the received message to computer 100.

In one embodiment, intermediate device 106 provides a reply indication to computer 108 indicating the failure of computer 108 to access computer 100. In another embodiment, intermediate device 106 fails to provide an indication to computer 108 regarding the result of the determination of enablement based on the electronic token.

A description of a further embodiment according to the present invention as applied to the field of email, and more specifically email filtering, is now provided. A user of client computer 100 desiring to limit the amount of unrequested email being received at client computer 100 causes the generation and transmission of an electronic token from the client computer to a computer 102 thereby enabling the client computer to identify and receive email having the electronic token from the computer 102. That is, upon receipt of an email, client computer 100 determines whether the email includes an electronic token indicating that the user of client computer 100 desires to receive the email.

Based on the contents of the electronic token, the client computer 100 determines whether to retain the email for further processing and possible presentation to the user at the client computer or to discard or otherwise prevent the email from further processing at client computer 100. For example in one embodiment, client computer 100 returns the email to the sending computer 102. In another embodiment, client computer 100 deletes the email from the client computer without notifying computer 102.

Figure 2:
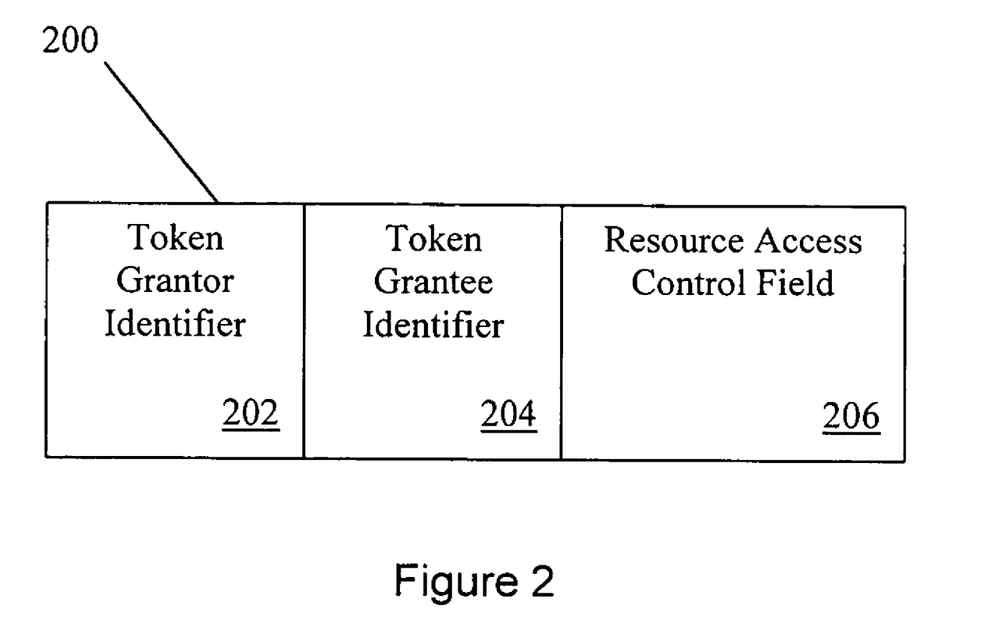
FIG. 2 is a high level block diagram of an electronic token according to an embodiment of the present invention.

A description of the generated electronic token is now provided. FIG. 2 depicts a high level block diagram of an electronic token 200 according to an embodiment of the present invention. Electronic token 200 includes a token grantor identifier 202 representing the entity, i.e., user, company, etc., granting access to a resource by a token grantee represented by a token grantee identifier 204. A resource access control field 206 determines the amount of access to the resource by the token grantee.

In one embodiment, token grantor identifier 202 identifies the user granting access to a resource, e.g., an identifier may include all or a portion of a user email address such as john.doe@isp.net or john.doe. The selected identifier should specifically identify the entity granting resource access. In another embodiment, token grantor identifier 202 identifies the domain of the user granting access to the resource, e.g., isp.net. In another embodiment, token grantor identifier 202 identifies the internet protocol (IP) address of the computer 100 granting access.

In one embodiment, token grantee identifier 204 identifies the user granted access to a resource, e.g., an identifier may include all or a portion of a user email address such as john.doe@isp.net or isp.net. The selected identifier should specifically identify the entity granted resource access. In another embodiment, token grantee identifier 204 identifies the domain of the user granted access to the resource, e.g., isp.net. A token grantee identifier 204 identifying a domain granted access enables access to a resource from any computer system in the domain. For example, if each of computers $104_1$-$104_N$ are in the same domain, e.g., <<domain.com>>, then each computer using an electronic token 200 having a token grantee identifier 204 of <<domain.com>> is able to access the same resource.

As a further example, a user at client computer 100 browsing using a web browser to a company web site is able to generate and transmit an electronic token 200 specifying the company domain as the token grantee identifier 204 to a company computer $104_1$ in order to allow any computer in the company domain, e.g., computer $104_1$-$104_N$ to transmit future email to client computer 100. Future email from a computer $104_{1-N}$ includes the electronic token 200 provided by the user at client computer 106. Subject to further restrictions described below in conjunction with the resource access control field 206, client computer 100 receives the email transmitted by a computer $104_{1-N}$ and verifies both the token grantee identifier 202 and the token grantor identifier 204. To be verified, electronic token 200 includes: a) the token grantor identifier 202 value known to the client computer 100 and b) the token grantee identifier 204 value matching all or a portion of identifying information of computer $104_{1-N}$, e.g., the domain of the transmitting computer if the token grantee identifier 204 specifies a domain. In another embodiment, verification of the token grantor identifier 202 includes determining if the destination address of the transmitted email matches the token grantor identifier 202. In a further embodiment, verification of the token grantee identifier 202 includes determining if the originating address of the transmitted email matches the token grantee identifier 202.

In another embodiment, token grantee identifier 204 identifies the internet protocol (IP) address of the computer 102 granted access.

Resource access control field 206 specifies additional restrictions imposed on the resource request received by client computer 100 beyond verification of the token grantor identifier 202 and token grantee identifier 204. Client computer 100 applies the additional specified restrictions in order to determine how to handle the resource request, e.g., whether the resource request such as an email is provided to the user at client computer 100, deleted, returned to the sender of the resource request, or a notification of failure of the resource request due to the additional restrictions is returned to the sender of the resource request. For example, client computer 100 receipt of a resource request having additional restrictions specified in resource access control field 206 of included electronic token 200 evaluates the resource request against the additional specified restrictions in order to determine if the restrictions are satisfied by the resource request. That is, if the additional restriction specified in resource access control field 206 specifies the receipt of an email message from the token grantee identifier 204 represented value on a specified date, client computer 100 determines whether the date on which the resource request is received matches the specified date. If the dates match, client computer 100 grants access to the requested resource. In the present example, client computer 100 accepts the email having electronic token 200 for the specified user.

Resource access control field 206 restrictions include time-based restrictions, format-based restrictions, and count-based restrictions. Time-based restrictions include restricting resource request grants to specified time periods, e.g., granting resource requests received after a specified start time, before a specified end time, and between a specified start time and a specified end time. The time specification includes specification based on a unit of time, e.g., seconds, minutes, hours, days, weeks, months, years, etc., or date, e.g., Jan. 13, 2007. In one embodiment, the time specification may specify that resource requests be granted for a period of time starting at the time of receipt of the first resource request.

Format-based restrictions include restricting resource request grants to specified formats, e.g., email having only text formatting, email having no attachments, email having no executable files. Upon receipt of a resource request, client computer 100 evaluates the resource request against the format-based restrictions specified in the resource access control field 206 to determine if the resource request satisfies the format-based restrictions. If the resource request satisfies the format-based restrictions, client computer 100 grants access to the requested resource.

Count-based restrictions include granting resource requests based on the number of resource requests received by client computer 100, e.g., limiting the number of resource requests from a given domain. For example, a user may desire to limit the number of emails to be received from a given domain.

Multiple different types of restrictions may be applied in the same resource access control field 206, e.g., an electronic token 200 may include both a time-based restriction and a count-based restriction. For example, a user may grant access to a given resource to a given domain for a limited number of accesses in a 24 hour period. In a specific example, a company grants a user an electronic token enabling user access of a web-based service provided by the company for a 30 day period and limited to 10 accesses of the service per day. The company computer, e.g., computer 102, denies resource requests by the user using the provided electronic token in excess of 10 requests per day and beyond the specified 30 day period.

In one embodiment, resource requesting computer 102 combines electronic token 200 as part of the resource request generated for transmission to client computer 100. In another embodiment, computer 102 embeds electronic token 200 within the header portion of a message including a resource request.

Listing 1 depicts an exemplary embodiment of an electronic token according to the present invention. The electronic token depicted in Listing 1 is an XML serialization of an RDF graph, i.e., Listing 1 is an RDF graph in an XML format, using a simplified RDF/XML syntax for the sake of clarity. It will be understood by persons skilled in the art that pure RDF or XML representations of the electronic token are possible.

Listing 1

```
<?xml version='1.0'?>
<RDF>
  <Person>
    <name>John Doe</name>
    <firstName>John</firstName>
    <surname>Doe</surname>
    <mbox>john.doe@isp.net</mbox>
    <phone resource="610-595-4995"/>
    <workplaceHomepage resource="http://www.resource.com/-doe"/>
    <allow>
      <Corporation>
        <name>XYZ Corporation </name>
        <mbox>xyz.com</mbox>
      </Corporation>
    </allow>
  </Person>
</RDF>
```

The combination of the data provided by elements <Person> and <allow> asserts that "John Doe allows XYZ Corporation" access. In particular, the <Person> element provides any necessary and optional details specifying the allowed destination for an email including the Listing 1 electronic token. The electronic token as embodied in the Listing 1 examples includes the following destination identifying elements <name>, <firstName>, <surname>, <mbox>, and <phone>, along with one or more homepage URIs. Use of destination identifying elements enables the cataloging and cross-indexing of electronic tokens, e.g., in large databases, for managing and correlating the tokens with other information, e.g., business records.

Given an example scenario using an electronic token to allow or deny access to a resource based on the transmission of an email, of the above-specified destination identifying elements, only the <mbox> element value (assumed to be unique) is assumed sufficient to uniquely identify a person. It is to be understood that additional or alternate uniquely identifying information may be used as necessary for implementation. Although a person is assumed to be unique for any given <mbox> element value, any one person may have multiple <mbox> element values.

The <allow> element includes details about the originator of the email, i.e., the entity to whom access to the resource is granted. In the example of Listing 1, a partial email address has been provided, i.e., the domain xyz.com, indicating an allowance of access to any email originating from the domain.

Further, in accordance with the example of Listing 1, all electronic token information, i.e., elements and corresponding element values, are transmitted in clear, unencrypted text. In another embodiment, digital signatures, hashes, and encryption may be used singly or in combination to protect the electronic token information from unauthorized viewing and/or tampering.

Listing 2 depicts an exemplary embodiment of the electronic token of Listing 1 wherein the <mbox> element has been replaced by an <mbox_sha1 sum> element and the <mbox> element value by a hashed version of the <mbox> element value hashed using the SHA-1 hashing algorithm.

Listing 2

```
<?xml version='1.0'?>
<RDF>
   <Person>
      <name>John Doe</name>
      <firstName>John</firstName>
      <surname>Doe</surname>
   <mbox_sha1sum>65d0217caf87d5cf060f75df36ed2cf7a56df692</mbox_sha1sum>
      <phone resource="610-595-4995"/>
      <workplaceHomepage resource="http://www.resource.com/-doe"/>
      <allow>
         <Corporation>
            <name>XYZ Corporation </name>
            <mbox>xyz.com</mbox>
         </Corporation>
      </allow>
   </Person>
</RDF>
```

Because both the <mbox> and <mbox_sha1sum> elements uniquely identify a person or other entity, a "round trip" encryption algorithm is not necessary. The <mbox> and <mbox_sha1sum> element values are not necessarily used to determine the destination for an email including the electronic token, rather the element values provide a guaranteed unique value and mechanism for identifying the person authorizing access to the resource.

A description of a working example based on the concatenation-based example described above is now provided. A software executable, i.e., a plug-in, useable in connection with an email client and a web browser executed by client computer 100 provides functionality enabling the generation and distribution of the above-described electronic token 200. The plug-in works as follows: John Doe visits the web site of the XYZ Corporation, i.e., located at <<http://www.xyz.com>>. By manipulating an "Authorize" button displayed by the web browser (provided by the plug-in), a token 200 is generated and transmitted to the web site. The token is the encrypted concatenation of John Doe's email address and the XYZ Corporation's domain: encrypt (john.doe@isp.net~xyz.com) A unique string asserting that John Doe will accept emails from the xyz.com domain is generated. Because the electronic token need not be decrypted by the grantee, DES or a derivative thereof (Triple DES) is useable in conjunction with the embodiment.

In one embodiment, if data included in the electronic token is for future use by client computer 100, client computer encrypts the data in the provided electronic token preventing unauthorized access to the data. In an alternate embodiment, a hash value entry included in the electronic token may be used as a lookup table index at client computer 100 to determine the data, i.e., resource access restrictions, provided to the grantee.

Computer 100 transmits the electronic token to the XYZ Corporation embedded in an email thereby allowing John Doe's email client to screen all incoming email except those bearing a valid electronic token 200. In addition to the above-described approaches, the validity and restrictions of an electronic token 200 may be determined by a number of approaches. In a first approach, client computer 100 reads the electronic token 200 and decrypts all or a portion of the token necessary to determine the identity of the request originator. In a second approach, client computer 100 reads the electronic token 200 and decrypts all or a portion of the token necessary to determine any access restrictions on access by the request originator. In a third approach, client computer reads the electronic token 200 and extracts a hash value for use as an index to a lookup table accessible by the client computer in order to determine access restrictions on the request originator.

Advantageously, the above-described embodiment allows for more flexibility in specifying restrictions and the ability to exchange information with the vendor (XYZ Corporation).

Example 1

John Doe would like to accept email from XYZ, but not necessarily on an unlimited basis. John Doe either sets the token to accept emails for a limited amount of time by setting an expiration date or by specifying a number of emails from XYZ to be allowed. For example, to accept email for the next 30 days: encrypt(john.doe@isp.net~xyz.com~20030609) or to accept the next three emails from XYZ: encrypt (john.doe@isp.net~xyz.com~#3) Client computer 100 transmits the generated token 200 to the vendor and the token must accompany each email from the vendor for comparison with the client computer white list. In the case of the numbered limit, an update must take place of the count at client computer 100 for the token 200 when the email arrives.

Example 2

John Doe specifies that he is only interested in information on widgets and not any other products that XYZ sells. John Doe's interest is asserted in an RDF statement, e.g., using RDF/XML format and included in an encrypted token 200 provided to a vendor. The encrypted token 200 becomes one of the assertions in the RDF. Other items included in the RDF may include:
  1. The expiration date for John Doe accepting emails from XYZ;
  2. The limit to the number of emails accepted from XYZ;
  3. Restrictions related to email format (No HTML, no ActiveX, etc.); and
  4. Restrictions related to attachments.

The above description of an embodiment according to the present invention describes the filtering of resource requests performed at client computer 100. While this approach limits resource misuse at the client computer 100, there is minimal or no benefit provided to other computers, e.g., a separate email server, a web server, and other network resources. In another embodiment, a filter synchronized with information on client computer 100 regarding electronic token 200, other computers or intermediate devices, e.g., computer $104_1$ or intermediate device 106, filter and approve/reject resource requests prior to reaching client computer 100 or an email server, web server, and other network resources. Intermediate device 106 may be a router, firewall, or similar device between a computer transmitting a resource request having an electronic token and client computer 100. In this manner, intermediate device 106 is able to evaluate resource requests prior to the requests reaching the resource. Because of the verification of token grantor identifier 202 and token grantee identifier 204 in combination with the resource access control field 206, unrequested resource requests are quickly evaluated and filtered without requiring evaluation of the request content beyond the electronic token 200.

The above examples demonstrate the applicability to the world of email. The same concepts apply to web services, i.e., the world of SOAP servers, and web servers in general.

A person using a browser (user) to access web sites may encounter a web site which restricts access using the present invention. In order for the user to gain access to the web site, the user first obtains an appropriate token allowing access. This token could be requested in a number of ways similar to those currently used to request a user account at web sites. These include a) requesting access via an email address provided on the web site (this portion of the site allowing access to users without a token), and b) filling out a form on the web site with sufficient information for the web site to determine whether authorization should be granted. This determination may be performed either automatically by a web application or manually by personnel responsible for reviewing the requests. Once the request is approved, the token is emailed to the user as raw data, or in the form of a small installation program storing the token in memory on the user computer system. In the case of an automated approval process, the token is download immediately from the web site to the users computer system and installed according to the specific implementation in the users web browser and/or email client. This scenario is very similar to current methods of web access control relying on browser cookies to store strings on the user computer system. In one embodiment, browser cookies are used to transmit and store the electronic token. This approach has the advantage of providing a higher-level abstraction of an identity in which the same electronic token may be used for multiple purposes including web browsers, email communication, and other forms of network communication using other protocols—FTP, TCP, etc.

An example of use with web services. This example is similar to the above example, adapted for machine-to-machine interaction. Web services describe a scenario in which one computer requests a service of another computer. Many of these scenarios are so-called "business-to-business" transactions. An example is the processing of a credit card transaction. The computer providing the service would be the grantor of the access and the electronic token. The computer using this service would be the consumer and the grantee of access to the resource and the token. The token could be requested in the same manner as above: an employee at the consumer location would need to "set up" access by requesting an account, and by receiving a token that would be installed on the consumer's machine for use by the software application which processes orders and hands off credit card payments for processing by the computer at the service provider site. Another, more dynamic system could be implemented whereby computer systems automate the request for a token. Existing standards for registries, such as Universal Description, Discovery, and Integration (UDDI) as specified by OASIS, are used.

Figure 3:
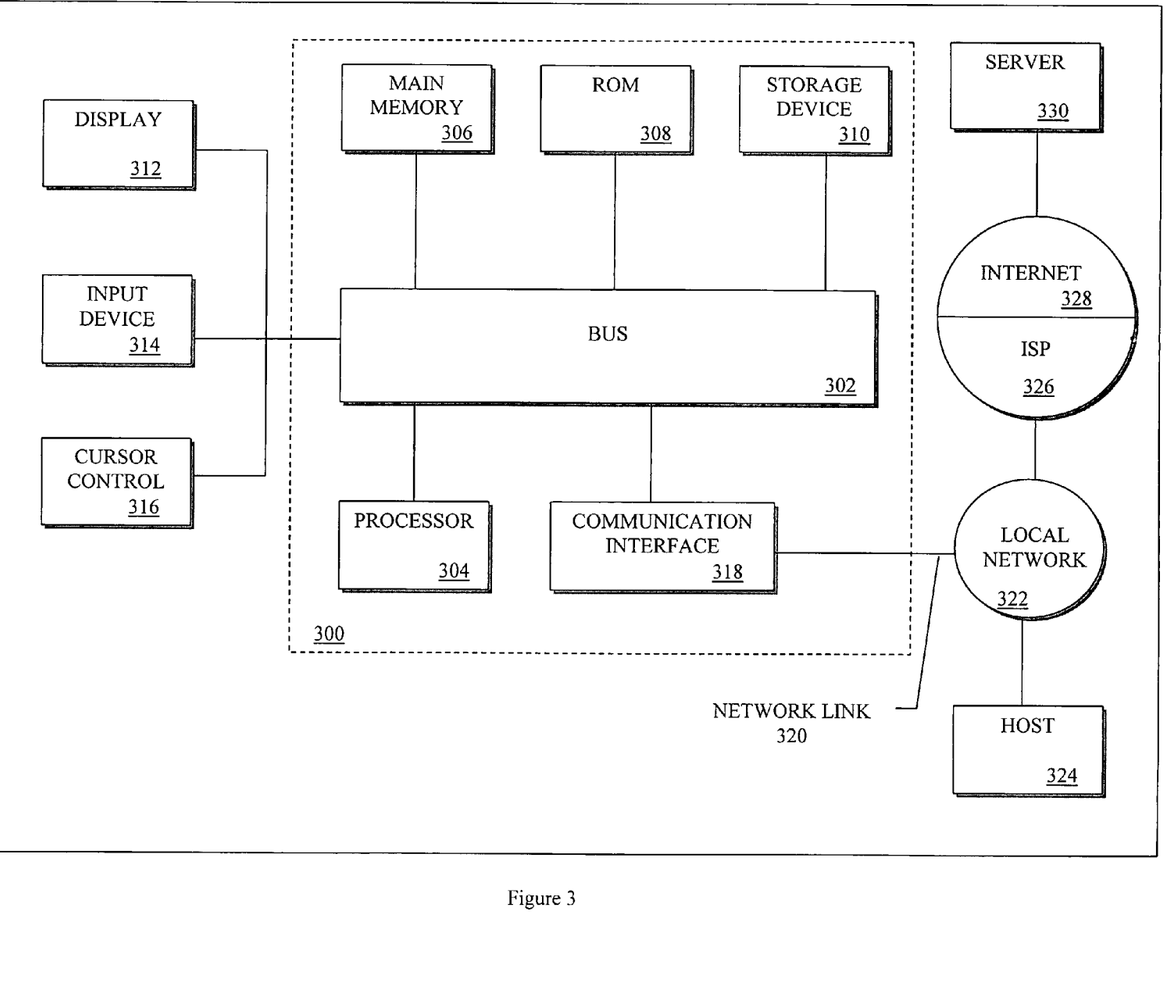
FIG. 3 is a high level block diagram of a computer system usable in conjunction with an embodiment of the present invention.

FIG. 3 is a block diagram illustrating an exemplary computer system 100 upon which an embodiment of the invention may be implemented. The present invention is usable with currently available personal computers, mini-mainframes and the like.

Computer system 100 includes a bus 302 or other communication mechanism for communicating information, and a processor 304 coupled with the bus 302 for processing information. Computer system 100 also includes a main memory 306, such as a random access memory (RAM) or other dynamic storage device, coupled to the bus 302 for storing data, an electronic token, and instructions to be executed by processor 304. Main memory 306 also may be used for storing an electronic token, temporary variables, or other intermediate information during execution of instructions to be executed by processor 304. Computer system 100 further includes a read only memory (ROM) 308 or other static storage device coupled to the bus 302 for storing static information and instructions for the processor 304. A storage device 310, such as a magnetic disk or optical disk, is provided and coupled to the bus 302 for storing data, an electronic token, and instructions.

Computer system 100 may be coupled via the bus 302 to a display 312, such as a cathode ray tube (CRT) or a flat panel display, for displaying information. An input device 314, including alphanumeric and function keys, is coupled to the bus 302 for communicating information and command selections to the processor 304. Another type of user input device is cursor control 316, such as a mouse, a trackball, or cursor direction keys for communicating direction information and command selections to processor 304 and for controlling cursor movement on the display 312. This input device typically has two degrees of freedom in two axes, a first axis (e.g., x) and a second axis (e.g., y) allowing the device to specify positions in a plane.

The invention is related to the use of computer system 100, such as the illustrated system of FIG. 3, to provide a system for generating, transmitting, and evaluating an electronic token 200. According to one embodiment of the invention, the electronic token 200 is provided to a connected computer system 102 by computer system 100 in response to processor 304 executing sequences of instructions contained in main memory 306 in response to input received via input device 314, cursor control 316, or communication interface 318. Such instructions may be read into main memory 306 from another computer-readable medium, such as storage device 310.

However, the computer-readable medium is not limited to devices such as storage device 310. For example, the computer-readable medium may include a floppy disk, a flexible disk, hard disk, magnetic tape, or any other magnetic medium, a CD-ROM, any other optical medium, any other physical medium with patterns of holes, a RAM, a PROM, an EPROM, a FLASH-EPROM, any other memory chip or cartridge, or any other physical medium from which a computer can read. Execution of the sequences of instructions contained in the main memory 306 causes the processor 304 to perform the process steps described below. In alternative embodiments, hard-wired circuitry may be used in place of or in combination with computer software instructions stored on a computer-readable medium to implement the invention. Thus, embodiments of the invention are not limited to any specific combination of hardware circuitry and software.

Computer system 100 also includes a communication interface 318 coupled to the bus 302. Communication interface 308 provides two-way data communication as is known. For example, communication interface 318 may be an integrated services digital network (ISDN) card, a digital subscriber line (DSL) card, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals which carry digital data streams representing various types of information. Of particular note, the communications through interface 318 may permit transmission or receipt of electronic token 200 from client computer 100 to computer 102 and a resource request from computer 102 to client computer 100. For example, two or more computer systems $104_{1-N}$ may be networked together in a conventional manner with each using the communication interface 318.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals which carry digital data streams. The signals through the various networks and the signals on network link 320 and through communication interface 318, which carry the digital data to and from computer system 100, are exemplary forms of carrier waves transporting the information.

Computer system 100 can send messages and receive data, including program code, through the network(s), network link 220 and communication interface 318. In the Internet example, a server 330 might transmit a requested code for an application program through Internet 328, ISP 326, local network 322 and communication interface 318. In accordance with the invention, one such downloaded application provides for generating and transmitting an electronic token.

The received code may be executed by processor 304 as it is received, and/or stored in storage device 310, or other non-volatile storage for later execution. In this manner, computer system 100 may obtain application code in the form of a carrier wave.

It will be readily seen by one of ordinary skill in the art that the present invention fulfills the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An electronic token stored in a memory and useable for controlling access to a resource, the token comprising:
    a token grantor identifier indicating a token grantor;
    a token grantee identifier indicating a token grantee;
    a resource access control field, wherein the resource access control field comprises one or more limitations which, when read by a processor, cause the processor to determine token grantee access to a resource as specified by the token grantor, where the resource comprises enablement of receipt by the token grantor of a communication from the token grantee; and
    where the token is configured to be embedded in a communication from the token grantee to the token grantor and further where the processor permits the communication to be received by the grantor subject to the limitations in the resource access field and further where the processor prevents communications without the embedded token from being received by the grantor.

2. The electronic token of claim 1, wherein the resource access control field indicates a time period for token grantee access to the resource by the token grantee.

3. The electronic token of claim 2, wherein the time period includes one of a start time and an end time for token grantee access to the resource.

4. The electronic token of claim 1, wherein the resource access control field indicates a maximum number of resource accesses by the token grantee.

5. The electronic token of claim 4, wherein the resource access control field further indicates a time period for token grantee access to the resource.

6. The electronic token of claim 1, wherein the resource access control field indicates a particular token content format for accessing the resource by the token grantee.

7. The electronic token of claim 6, wherein the particular token content format includes one of text, hypertext markup language, or extensible markup language.

8. The electronic token of claim 1, wherein the electronic token is specified in extensible markup language format.

9. The electronic token of claim 1, wherein the electronic token is specified in resource description framework format.

10. The electronic token of claim 1, wherein the token grantee identifier, the token grantor identifier, and the resource access control field are concatenated.

11. The electronic token of claim 10, wherein the concatenated token grantee identifier, the token grantor identifier, and the resource access control field are hashed.

12. The electronic token of claim 11, wherein the hashed, concatenated token grantee identifier, the token grantor identifier, and the resource access control field are encrypted.

13. The electronic token of claim 1, wherein the resource access control field is encrypted.

14. The electronic token of claim 1, wherein the token grantor identifier includes at least one of a domain name, an email address, and a unique identifier.

15. The electronic token of claim 1, wherein the token grantee identifier includes at least one of a domain name, an email address, and an IP address.

16. A method for generating and using an electronic token having a token grantee identifier, a token grantor identifier, and a resource access control field, comprising the steps of:
    generating an electronic token based on a token grantee identifier, a token grantor identifier, and a resource access control field, wherein the resource access control field indicates control of additional limitations of token grantee access to a resource as specified by the token grantor, where the resource comprises enablement of receipt by a token grantor associated with the token grantor identifier of a communication from a token grantee associated with the token grantee identifier;
    transmitting the electronic token to a token grantee computer system;
    receiving a communication from the token grantee computer system, the communication having embedded therein the electronic token; and
    transmitting the communication including the embedded electronic token from the token grantee computer system to a computer system controlling access to the resource requested by the token grantee computer system where the computer system controlling access to the resource permits the communication to be received by the grantor subject to the limitations in the resource access field and further where the computer system prevents communications without the embedded token from being received by the grantor.

17. The method of claim 16, wherein the generating step further comprises concatenating the token grantee identifier, the token grantor identifier, and the resource access control field.

18. The method of claim 16, wherein the generating step further comprises encrypting the token grantee identifier, the token grantor identifier, and the resource access control field.

19. The method of claim 16, further comprising the step of:
    determining, by the computer system controlling access to the resource requested by the token grantee computer system, whether to grant the token grantee computer system access to the requested resource based on the content of the electronic token; and
    if access is granted, transmitting the resource request to the resource requested by the token grantee computer system.

20. The method of claim 19, wherein the determining step comprises: decrypting a portion of the electronic token to identify determine the token grantee.

21. The method of claim 19, wherein the determining step comprises:
   decrypting a portion of the electronic token to determine access restrictions on access to the requested resource by the token grantee computer system.

22. The method of claim 19, wherein the determining step comprises:
   determining, based on a hash value in the electronic token and a lookup table accessible by the computer system controlling access, restrictions on access to the requested resource by the token grantee computer system.

23. A system for generating and using an electronic token having a token grantee identifier, a token grantor identifier, and a resource access control field, comprising:
   a processor for receiving and transmitting data; and
   a memory coupled to the processor, the memory having stored therein instructions causing the processor to:
   generate an electronic token including a token grantee identifier, a token grantor identifier, and a resource access control field, wherein the resource access control field indicates control of additional limitations of token grantee access to a resource as specified by the token grantor, where the resource comprises enablement of receipt by the token grantor associated with the token grantor identifier of a communication from a token grantee associated with the token grantee identifier;
   transmit the electronic token to a token grantee computer system;
   upon receiving a communication having the electronic token embedded therein from the token grantee computer, transmitting the communication including the embedded electronic token from the token grantee computer system to the token grantor subject to the limitations in the resource access field; and
   prevent communications without the embedded token from being received by the token grantor.

24. The system of claim 23, wherein the processor is configured to generate the electronic token, where the token is configured to be embedded in the communication from the token grantee computer to the token grantor and further where the processor permits the communication to be received by the grantor subject to the limitations in the resource access field and further wherein the processor prevents communications without the embedded token from being received by the grantor.

* * * * *

UNITED STATES PATENT AND TRADEMARK OFFICE
CERTIFICATE OF CORRECTION

| | | |
|---|---|---|
| PATENT NO. | : 7,924,709 B2 | Page 1 of 1 |
| APPLICATION NO. | : 10/843593 | |
| DATED | : April 12, 2011 | |
| INVENTOR(S) | : James Lynn | |

It is certified that error appears in the above-identified patent and that said Letters Patent is hereby corrected as shown below:

In column 13, line 3, in Claim 20, after "identify" delete "determine".

Signed and Sealed this
Thirteenth Day of September, 2011

David J. Kappos
*Director of the United States Patent and Trademark Office*